United States Patent

Chang

[11] Patent Number: 5,613,596
[45] Date of Patent: Mar. 25, 1997

[54] SHOE CONVEYER DEVICE

[76] Inventor: Liang-Tsuen Chang, No. 23, Chin Kao Road, Pu Hsin Hsiang, Chang Hua County, Taiwan

[21] Appl. No.: 453,088

[22] Filed: May 30, 1995

Related U.S. Application Data

[63] Continuation-in-part of Ser. No. 394,961, Feb. 27, 1995.
[51] Int. Cl.⁶ .................................................. B65G 17/34
[52] U.S. Cl. .............................. 198/803.11; 198/803.14; 12/1 A
[58] Field of Search .............................. 198/470.1, 473.1, 198/803.7, 803.11, 803.14, 803.15; 12/1 A, 123, 124

[56] References Cited

U.S. PATENT DOCUMENTS 2,888,127  5/1959  Uhlig ................................. 198/803.14
3,340,996  9/1967  Cerf .................................. 198/803.14
5,205,009  4/1993  Cottino et al. ...................... 198/803.11

FOREIGN PATENT DOCUMENTS 93310192  12/1993  European Pat. Off. .

*Primary Examiner*—Joseph E. Valenza
*Attorney, Agent, or Firm*—Beveridge, DeGrandi, Weilacher & Young LLP

[57]  ABSTRACT

A conveyer device includes a number of shafts coupled to a chain, and a number of platforms and beams rotatably coupled to the shafts. A number of springs are engaged on the shafts and are secured to the platforms and the beams for resiliently supporting the beams and for resiliently supporting the shoes between the beams. The beams are moved away from each other against the springs for supporting shoes of different sizes. The springs are not engaged between the beams such that the springs will not engage with the shoes supported between the beams.

2 Claims, 5 Drawing Sheets

SHOE CONVEYER DEVICE

This application is a continuation-in-part of parent application Ser. No. 08/394,961 filed Feb. 27, 1995.

BACKGROUND OF THE INVENTION

1. Field of the Invention

The present invention relates to a conveyer device, and more particularly to a conveyer device conveying shoes and shoe soles.

2. Description of the Prior Art

A typical shoe conveyer device is disclosed in European patent application no. 93310192.5 and comprises two spaced apart support members for supporting a shoe therebetween. The support members are pivotally coupled to a pair of shaft means; and a spring is coupled between the support members for resiliently coupling the support members together. However, the spring is coupled between the support members and may be engaged with the shoes engaged between the support members such that the spring may be easily broken and the shoes may be easily damaged the spring.

The present invention has arisen to mitigate and/or obviate the afore-described disadvantages of the conventional shoe conveyer devices.

SUMMARY OF THE INVENTION

The primary objective of the present invention to provide a shoe conveyer device which may stably support and convey the shoe bodies and shoe soles.

In accordance with one aspect of the invention, there is provided a conveyer device for conveying shoe soles and shoe bodies thereon, the conveyer device comprising a chain means including a plurality of shafts laterally extended therefrom, at least one platform coupled between the shafts for supporting shoe soles thereon, a plurality of beams rotatably coupled to the shafts and arranged close to each other so as to form a gap therebetween for engaging with and for supporting shoe bodies thereon, and a plurality of springs each including a middle portion engaged on the shafts and each including two end portions secured to the platform and the beams for resiliently supporting the beams and for resiliently supporting the shoe bodies between the beams, the beams being moved away from each other against the springs for supporting shoe bodies of different sizes. The springs are engaged on the shafts in order not to engage with shoe bodies supported between the beams.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
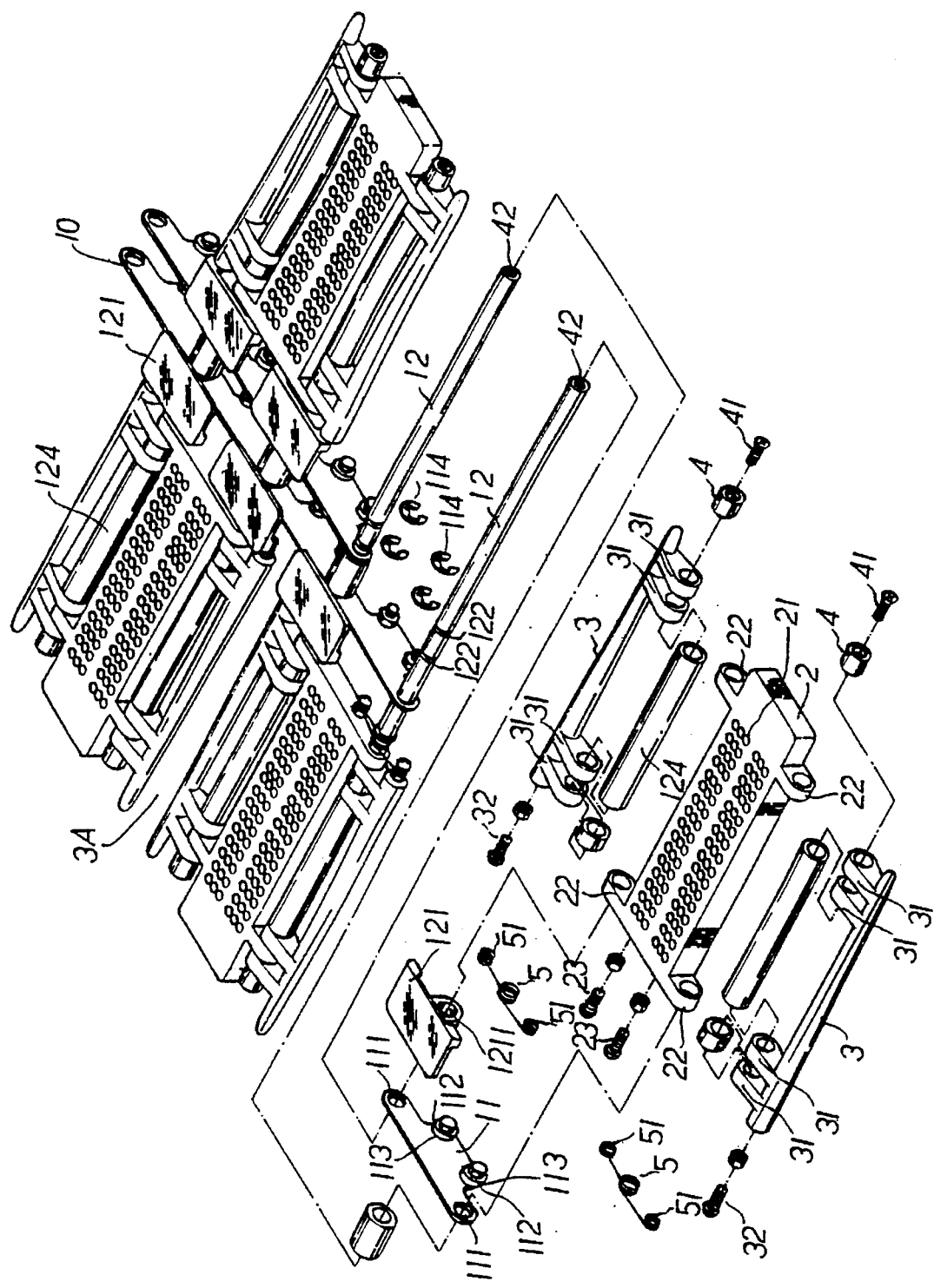
FIG. 1 is an exploded view of a shoe conveyer device in accordance with the present invention.
Figure 2:
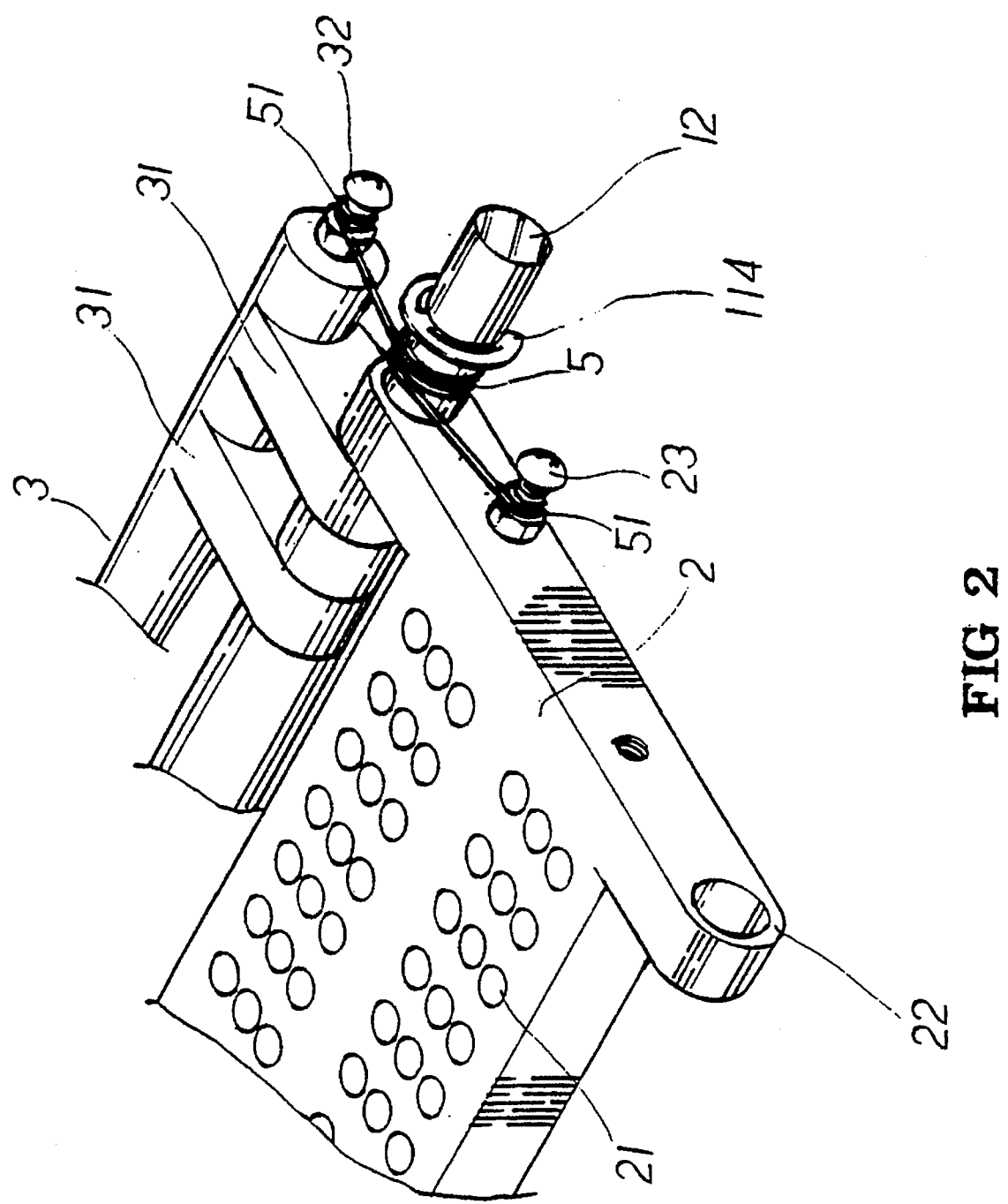
FIG. 2 is a partial perspective view of the shoe conveyer device.
Figure 3:
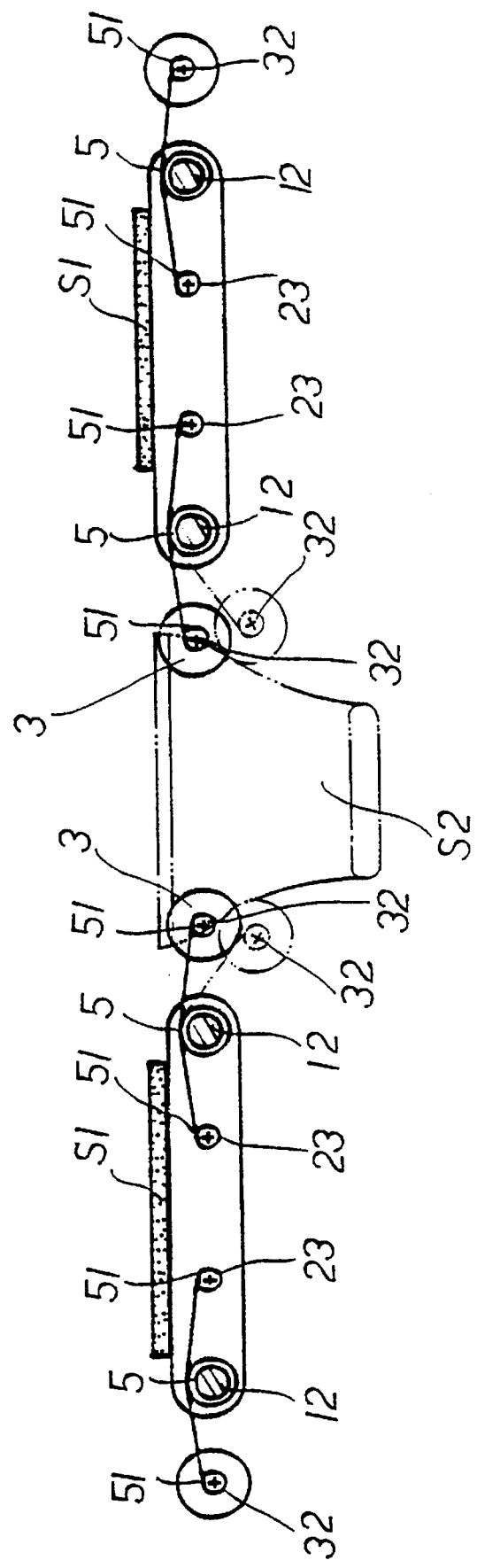
FIG. 3 is a cross sectional view illustrating the operation of the shoe conveyer device.

Referring to the drawings, and initially to FIGS. 1 to 3, a shoe conveyer device in accordance with the present invention comprises a chain device 10 including two rows of plates 11 having holes 111 formed in the end portions for engaging with shafts 12. The shafts 12 each includes two annular grooves 122 formed in the middle portion for engaging with retaining rings 114 which may retain the plates 11 in place. Each of the shafts 12 includes two end portions having inner threads 42 formed therein. A number of boards 121 each includes a hub 1211 for engaging on the shafts 12 and the plates 11. The plates 11 each includes two orifices 112 formed in the middle portion for engaging with rollers 113 and for facilitating the movement of the chain device 10. The shafts 12 each includes two end portions having two tubes 124 rotatably engaged thereon, and each includes two end members 4 fixed to the ends by screws 41 for retaining the parts and elements in place, best shown in FIG. 1. The screws 41 are threadedly engaged with the screw holes 42 of the shafts 12.

A number pairs of beams 3 each includes two or more lugs 31 for rotatably engaging with the shafts 12. Each pair of the beams 3 includes a gap 3A (FIG. 1) formed between the beams 3. A number of platforms 2 each includes a number of ears 22 for rotatably secured to the shafts 12 and each includes a number of apertures 21 formed therein for air circulation purposes. The platforms 2 are provided for stably supporting shoe soles S1 thereon, best shown in FIG. 3. A number of springs 5 each includes a middle portion engaged on the shafts 12 and each includes two end portions 51 secured to the beams 3 and the platforms 2 by screws 32 and 23 respectively such that the beams 3 are resiliently coupled to the shafts 12, best shown in FIGS. 2 and 3. As best shown in FIG. 3, when the shoe body S2 is engaged between the beams 3, the beams 3 may move downward and may resiliently support the shoe body S2 in place such that shoe bodies of different sizes may be suitably supported between the pair of beams 3.

Both the shoe soles S1 and the shoe bodies S2 have adhesive materials applied thereon and will be moved inward of an oven for heating and drying the adhesive materials before the shoe soles and the shoe bodies are adhered together. It is preferable that the platforms 2 and the pair of beams 3 are arranged in alternation or arranged in a stagger way, such that the shoe soles and the shoe bodies may be easily adhered together in pairs after moving out of the oven.

It is to be noted that the springs 5 are not coupled between the beams 3 such that the springs 5 will not be engaged with the shoe bodies supported between the beams.

Figure 4:
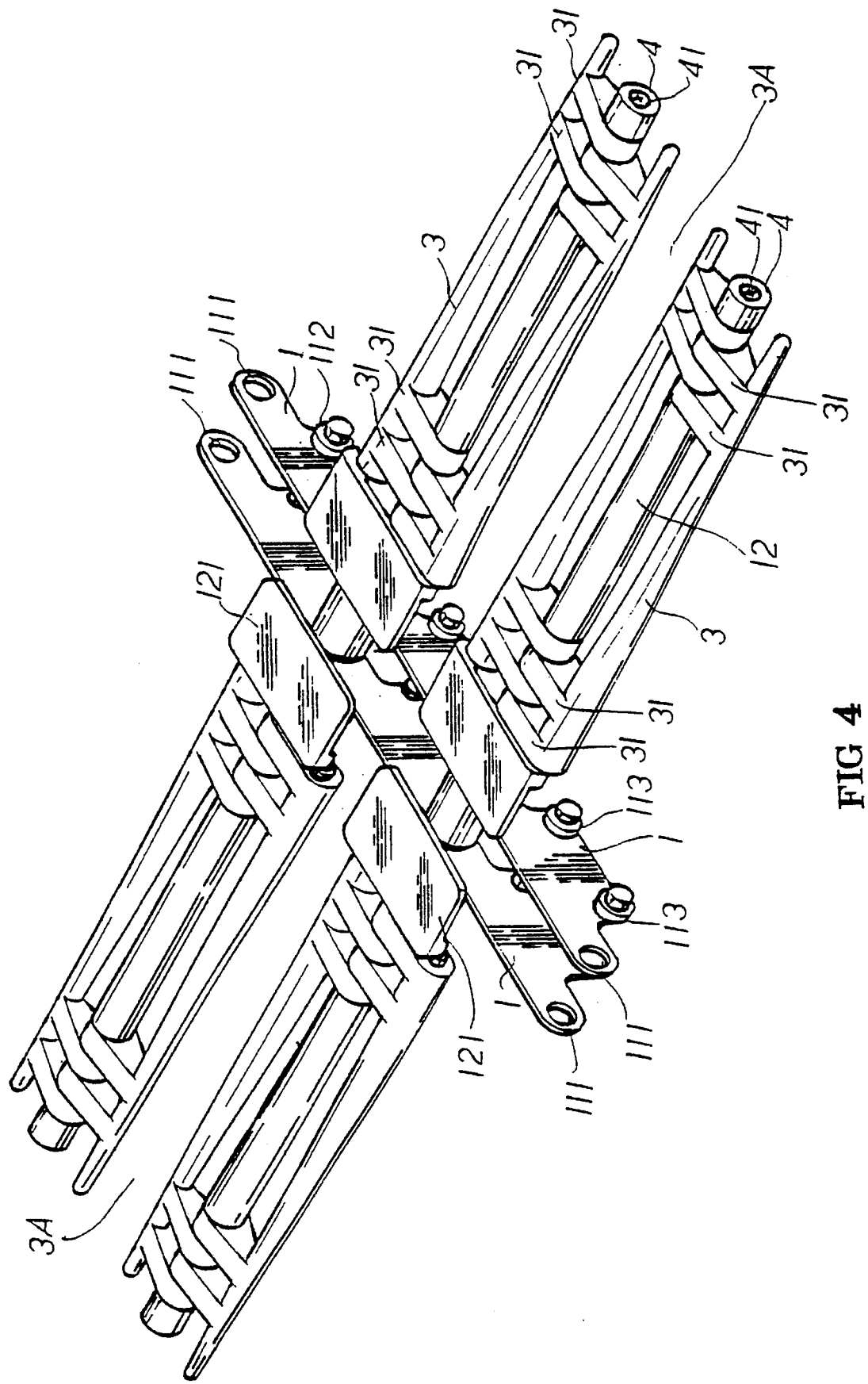
FIG. 4 is an exploded view illustrating another application of the shoe conveyer device.
Figure 5:
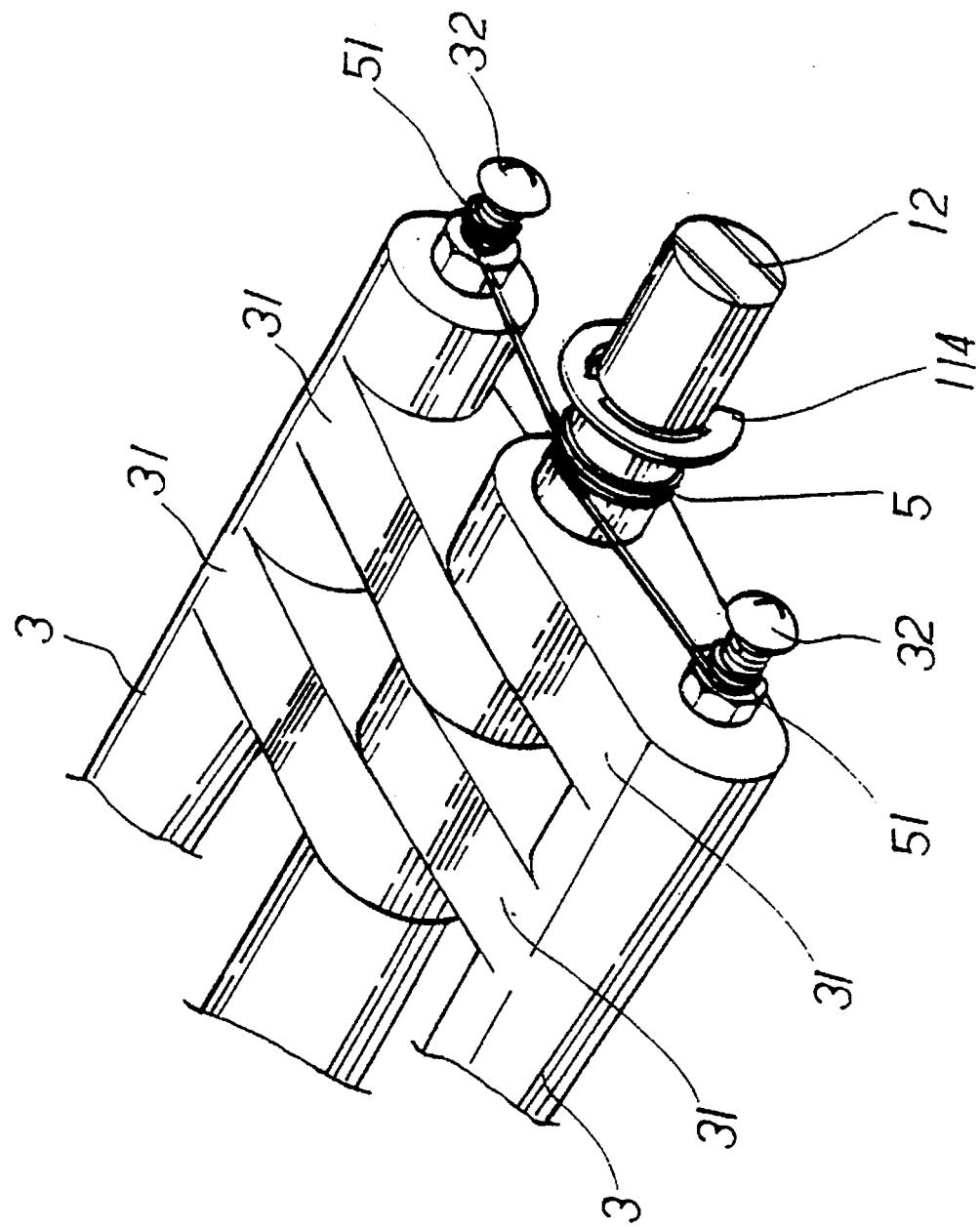
FIG. 5 is a partial perspective view of the shoe conveyer device as shown in FIG. 4.

As shown in FIGS. 4 and 5, when the platforms 2 are not required and when the platforms 2 are disengaged from the shafts 12, other beams 3 may be pivotally coupled to the shafts 12 instead of the platforms 2. The end portions of the springs 5 may be secured to the pair of beams 3 such that the springs 5 also may not be engaged with the shoe bodies supported between the beams and such that the shoe bodies may be stably supported in place.

Accordingly, the shoe conveyer device of the present invention includes a number of springs that will not be exposed and that will not be engaged with the shoe bodies supported between the beams.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A conveyer device for conveying shoe soles and shoe bodies thereon, said conveyer device comprising:

a chain means including a plurality of shafts laterally extended therefrom, at least one platform coupled between said shafts for supporting shoe soles thereon, a plurality of beams rotatably coupled to said shafts and arranged close to each other so as to form a gap therebetween for engaging with and for supporting shoe bodies thereon, and a plurality of springs each including a middle portion engaged on said shafts and each including two end portions secured to said platform and said beams for resiliently supporting said beams and for resiliently supporting said shoe bodies between said beams, said beams being moved away from each other against said springs for supporting shoe bodies of different sizes;

wherein said springs are engaged on said shafts in order not to engage with shoe bodies supported between said beams.

2. A conveyer device for conveying shoe soles and shoe bodies thereon, said conveyer device comprising:

a chain means including a plurality of shafts laterally extended therefrom, a plurality pairs of beams rotatably coupled to said shafts, a plurality of springs each including a middle portion engaged on said shafts and each including two end portions secured to said beams for resiliently supporting said beams and for resiliently supporting shoe bodies between said beams, said beams being moved away from each other against said springs for supporting shoe bodies of different sizes;

wherein said springs are engaged on said shafts in order not to engage with shoe bodies supported between said beams.

* * * * *